US008099664B2

(12) United States Patent
Kureshy et al.

(10) Patent No.: US 8,099,664 B2
(45) Date of Patent: Jan. 17, 2012

(54) DYNAMIC HELP USER INTERFACE CONTROL WITH SECURED CUSTOMIZATION

(75) Inventors: Arif Kureshy, Sammamish, WA (US);
Gary F. Syck, Kirkland, WA (US);
Muhammad Adnan Alam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 11/378,049

(22) Filed: Mar. 17, 2006

(65) Prior Publication Data

US 2007/0220428 A1    Sep. 20, 2007

(51) Int. Cl.
*G06F 3/00* (2006.01)
(52) U.S. Cl. .................. 715/705; 715/708; 715/745
(58) Field of Classification Search .............. 715/705, 715/708, 741
See application file for complete search history.

(56) References Cited

U.S. PATENT DOCUMENTS

| | | | | |
|---|---|---|---|---|
| 5,103,498 | A | * | 4/1992 | Lanier et al. ............... 706/58 |
| 5,239,617 | A | | 8/1993 | Gardner et al. |
| 5,361,361 | A | | 11/1994 | Hickman et al. |
| 5,715,415 | A | | 2/1998 | Dazey et al. |
| 6,133,917 | A | * | 10/2000 | Feigner et al. ............. 715/708 |
| 6,209,006 | B1 | | 3/2001 | Medl et al. |
| 6,246,404 | B1 | | 6/2001 | Feigner et al. |
| 6,259,445 | B1 | | 7/2001 | Hennum et al. |
| 6,307,544 | B1 | | 10/2001 | Harding |
| 6,340,977 | B1 | | 1/2002 | Lui et al. |
| 6,456,303 | B1 | * | 9/2002 | Walden et al. ............. 715/705 |
| 6,487,665 | B1 | * | 11/2002 | Andrews et al. ........... 726/26 |
| 6,587,121 | B1 | | 7/2003 | Nelson et al. |
| 6,678,706 | B1 | | 1/2004 | Fishel |
| 6,788,313 | B1 | | 9/2004 | Heil |
| 6,801,222 | B1 | | 10/2004 | Dunham et al. |
| 6,857,103 | B1 | | 2/2005 | Wason |
| 6,920,612 | B2 | | 7/2005 | Makinen |
| 7,127,675 | B1 | * | 10/2006 | Kates et al. ............... 715/705 |
| 7,162,717 | B1 | | 1/2007 | Harris |

(Continued)

FOREIGN PATENT DOCUMENTS

WO    WO-01/01285    1/2001

(Continued)

OTHER PUBLICATIONS

Matthew Ellison, "WinWriters—Security and Microsoft Help," Archived: Jun. 17, 2004.*

(Continued)

*Primary Examiner* — Tuyetlien T Tran
(74) *Attorney, Agent, or Firm* — Turk IP Law, LLC

(57) ABSTRACT

A method and system is disclosed for generating a help interface to present static help content and customized help content for an application. Help content data is accessed to define the static help content and a control command to support incorporation of the customized help content. The control command is implemented to determine a configuration of the application, and a user context is determined based on a user characteristic and the application configuration. The customized help content is then resolved based on the control command and the user context. In some cases, a help system may include a help viewer module or program in communication with a computer-readable memory storing the help content data. The help viewer may then render the help interface based on the static help content and customized help content resolved from the control command, the application configuration, and other aspects of the user context in which it is presented.

2 Claims, 10 Drawing Sheets

U.S. PATENT DOCUMENTS

| | | | |
|---|---|---|---|
| 7,415,696 | B2 | 8/2008 | Cohen et al. |
| 2002/0023144 | A1 | 2/2002 | Linyard et al. |
| 2002/0194164 | A1 | 12/2002 | Morrow et al. |
| 2003/0101165 | A1 | 5/2003 | Warren |
| 2003/0229608 | A1 | 12/2003 | Reynar et al. |
| 2004/0036715 | A1 | 2/2004 | Warren |
| 2004/0044635 | A1* | 3/2004 | Gordon et al. .................. 706/50 |
| 2004/0187082 | A1 | 9/2004 | Hathaway |
| 2005/0125729 | A1 | 6/2005 | Lee et al. |
| 2005/0154986 | A1* | 7/2005 | Bartek et al. .................. 715/714 |
| 2005/0228826 | A1 | 10/2005 | Beran et al. |
| 2006/0080607 | A1* | 4/2006 | Cohen et al. .................. 715/705 |
| 2006/0129931 | A1* | 6/2006 | Simons et al. ................. 715/705 |
| 2007/0136667 | A1 | 6/2007 | Gerhart et al. |
| 2007/0162485 | A1* | 7/2007 | Haeberle et al. ............. 707/102 |
| 2007/0220428 | A1 | 9/2007 | Kureshy et al. |
| 2007/0220429 | A1 | 9/2007 | Kureshy et al. |

FOREIGN PATENT DOCUMENTS

WO      WO 03048930 A2 *  6/2003

OTHER PUBLICATIONS

Gregory Brill, "Applying COM+," Copyright 2001, New Riders Publishing, Chapters 2 and 12.*

"Making Custom Help Content Accessible," http://office.microsoft.com/en-us/assistance/HA011362721033.aspx, pp. 1-11 (Jan. 2006).

"Macromedia RoboHelp X5," http://www.macromedia.com/software/robohelp/?promoid=BINZ, pp. 1-2 (Jan. 2006).

"What Makes AuthorIT Different," http://www.author-it.com/index.mv?different, pp. 1-4 (1996-2005).

Carlton et al., "Customizing Tools to Manage Complex Online Help Development," http://delivery.acm.org/10.1145/240000/238248/p29-carlton.pdf?key1=238248&key2=7770976311&coll=GUIDE&dl=GUIDE&CFID=64967036&CFTOKEN=6240564, pp. 29-36 (1996).

Young et al., "Dynamic Help: Automated Online Documentation," http://ieeexplore.ieee.org/xpl/abs_free.jsp?arNumber=217243, pp. 448-457 (1992).

Caldwell, "CogentHelp: A Tool for Authoring Dynamically Generated Help for Java GUIs," http://delivery.acm.org/10.1145/270000/263371/p17-caldwell.pdf?key1=263371&key2=0427943311&coll=GUIDE&dl=GUIDE&CFID=61918287&CFTOKEN=61691722, pp. 17-22 (1997).

Sukaviriya, "Dynamic Construction of Animated Help from Application Context," http://delivery.acm.org/10.1145/70000/62433/p190-sukaviriya.pdf?key1=62433&key2=6259943311&coll=GUIDE&dl=GUIDE&CFID=61920191&CFTOKEN=27897852, pp. 190-202 (1988).

Sukaviriya et al., "Automatic Generation of Textual, Audio, and Animated Help in UIDE: The User Interface Design Environment," http://delivery.acm.org/10.1145/200000/192322/p44-sukaviriya.pdf?key1=192322&key2=5250053311&coll=GUIDE&dl=GUIDE&CFID=61920915&CFTOKEN=72010818Abstract, pp. 44-52 (1994).

"Technical Information: Utilitizing Axapta Application Layers," Microsoft technical bulletin, pp. 1-15 (2002).

Peter Aitken, Sams Teach Yourself Word 2000, Apr. 28, 1999, 1-8.

Peter Aitken, Bookcover Sams Teach Yourself Word 2000, Apr. 28, 1999, 1-2.

Char James-Tanny, Sams Teach Yourself RoboHelp 2000 for HTML Help in 24 Hours, Sams, Bookcover, Oct. 25, 1999, pp. 1-3.

Char James-Tanny, Sams Teach Yourself RoboHelp 2000 for HTML Help in 24 Hours, Sams, Chapter: What is HTML Help, Oct. 25, 1999, pp. 1-5.

Char James-Tanny, Sams Teach Yourself RoboHelp 2000 for HTML Help in 24 Hours, Sams, Chapter: Setting the Compilation Options, Oct. 25, 1999, pp. 1-6.

Char James-Tanny, Sams Teach Yourself RoboHelp 2000 for HTML Help in 24 Hours, Sams, Chapter: What are Hyperlinks?, Oct. 25, 1999, pp. 1-3.

Char James-Tanny, Sams Teach Yourself RoboHelp 2000 for HTML Help in 24 Hours, Sams, Chapter: Understanding the Merging Concepts, Oct. 25, 1999, pp. 1-5.

Char James-Tanny, Sams Teach Yourself RoboHelp 2000 for HTML Help in 24 Hours, Sams, Chapter: Planning for future .cmh files, Oct. 25. 1999. pages 1-3.

Char James-Tanny, Sams Teach Yourself RoboHelp 2000 for HTML Help in 24 Hours, Sams, Chapter: What files should I ship?, Oct. 25, 1999, pp. 1-3.

Char James-Tanny, Sams Teach Yourself RoboHelp 2000 for HTML Help in 24 Hours. Sams, Chapter: TOC Composer, Oct. 25, 1999, pp. 1-10.

Char James-Tanny, Sams Teach Yourself RoboHelp 2000 for HTML Help in 24 Hours, Sams, Chapter: Which Graphic Formats Should I Include?, Oct. 25, 1999, pp. 1-4.

Char James-Tanny, Sams Teach Yourself RoboHelp 2000 for HTML Help in 24 Hours, Sams, Chapter: Creating a Glossary, Oct. 25, 1999, pp. 1-4.

Char James-Tanny, Sams Teach Yourself RoboHelp 2000 for HTML Help in 24 Hours, Sams, Chapter: Using the TOC composer, Oct. 25,1999, pp. 1-10.

Char James-Tanny, Sams Teach Yourself RoboHelp 2000 for HTML Help in 24 Hours, Sams, Chapter: Creating an Index, Oct. 25, 1999, pp. 1-17.

Char James-Tanny, Sams Teach Yourself RoboHelp 2000 for HTML Help in 24 Hours, Sams, Chapter: Viewing External Hyperlinks, Oct. 25, 1999, 5 pages.

Char James-Tanny, Sams Teach Yourself RoboHelp 2000 for HTML Help in 24 Hours, Sams, Chapter. Creating Hyperlinks, Oct. 25, 1999, 3 pages.

Char James-Tanny, Sams Teach Yourself RoboHelp 2000 for HTML Help in 24 Hours, Sams, Chapter: Editing Hyperlinks, Oct. 25, 1999, 1 page.

Char James-Tanny, Sams Teach Yourself RoboHelp 2000 for HTML Help in 24 Hours, Sams, Chapter: Defining Hyperlink Destinations, Oct. 25, 1999, pp. 1-7.

* cited by examiner

DYNAMIC HELP USER INTERFACE CONTROL WITH SECURED CUSTOMIZATION

RELATED APPLICATION

This application relates to commonly owned U.S. application Ser. No. 11/378,149, entitled "Layered Customization of a Help User Interface" and filed concurrently herewith, the entire disclosure of which is hereby incorporated by reference.

BACKGROUND

Business applications and other computer software applications are typically shipped with a help system to explain various aspects, features and components of the application. Help systems are invoked by users of the applications when the user has a question or encounters a problem. Help systems then generate a help user interface to present information directed to the question or problem.

In many applications, the help user interface presents the user with an opportunity to select from a general index of help topics and sub-topics and thereby navigate to the desired content. Some applications provide an interface querying the user for keywords indicative of the question or problem. In either case, the user interface provides a mechanism to locate the desired content within a database or other set of previously prepared articles or content items covering various topics, sub-topics, frequently asked questions (FAQ), etc.

Some help systems are context-sensitive to facilitate an automatic presentation of relevant help content. In these cases, the help system is invoked from within the application via user selection of an element displayed in the application's user interface. The selected display element may constitute, for instance, a display window, box, or panel, or a component thereof, such as a graphical button or pull-down menu. By selecting such display elements in connection with invoking the help system, often via a keystroke (e.g., the function key F1), the user is then presented with help content related to the selected display element. In this way, the help topic index and keyword query are bypassed, and the help user interface automatically displays a targeted portion of the content available for presentation.

Despite improvements in help user interfaces, help systems typically remain limited to the presentation of static content previously prepared by or on behalf of the software developer. But updates, changes and revisions to the help content become necessary over time. In response, software developers have made help resources available on-line. In this way, the software developer can update the content from time to time as necessary.

Generally speaking, however, the use of on-line help resources has, at times, undesirably removed the user from the application environment. As a result, on-line help resources may be limited to presenting a topic index, a keyword query, or FAQ list. That is, once outside of the application environment, the help system may be unable to tailor the content based on the context of the help request. As a result, on-line resources and other help systems generally remain limited to presenting generic content not customized for the user context in which it is requested. Such generic content typically relates to standard features of the application. Any customization for a specific installation would then not be covered. In these ways, the help files shipped with a product or provided later via an on-line delivery have typically been static and incapable of adaptation to a customized application.

In fact, on-line and other help resources may become incompatible with the application environment due to customization after shipment by the original developer. Such customization may arise from a variety of secondary development sources, including development partners, system administrators, and end users. Often, the secondary developments can be extensive. As a result, applications have been shipped with the capability of providing secondary developers with the opportunity to add to and modify the help content made available to end users. Unfortunately, incompatibility problems may still arise after such changes to the help content have been made. For example, software updates subsequently released by the original developer may overwrite or otherwise corrupt the customizations to the help system that had been made by the secondary developer since the previous revision or update.

SUMMARY

A help system and method for generating a help user interface having both static and dynamic help content is disclosed. The disclosed system and method generate the help user interface in accordance with the configuration of the application for which the help content is requested. The configuration of the application may include or incorporate any number of customizations of the application functionality. In some cases, the application configuration may be indicative of user characteristics or application functionality made available to the user. The dynamic help content may then be rendered in a customized fashion in accordance with the user characteristics or the available application functionality. The help user interface may then be generated with help content customized to a specific user context. In this way, the help system may appropriately address widely varying configurations of the application, and support different types of users. In some cases, the reliance on the application configuration or user context may provide security protections against unauthorized access to, or use of, program application data via the help user interface.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
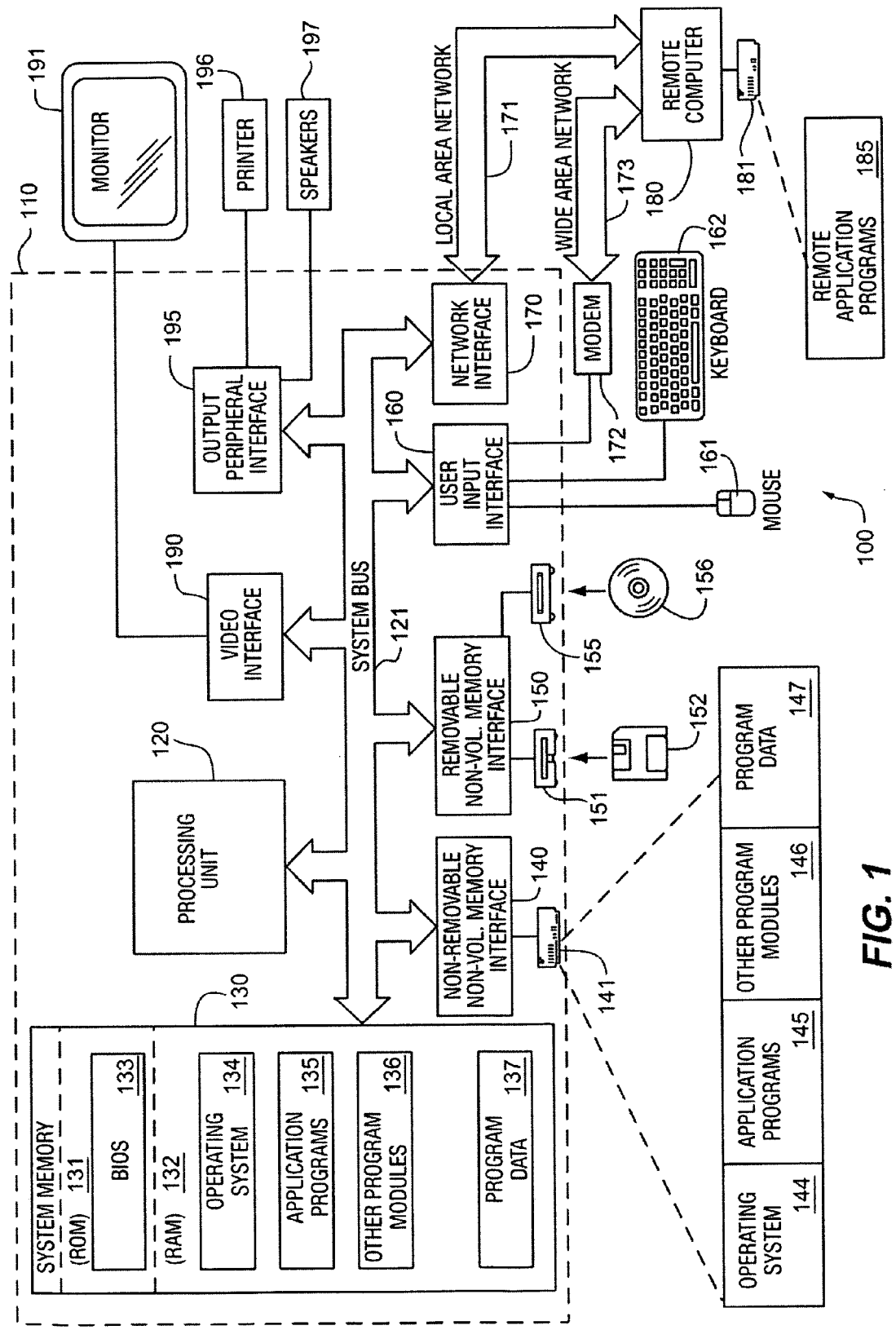
FIG. 1 is a block diagram of a computing system that may operate in accordance with the claims.

FIG. 1 illustrates an example of a suitable computing system environment 100 on which a system for the steps of the claimed method and system may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that can be accessed by computer 110 and includes both volatile and nonvolatile media, removable and non-removable media. By way of example, and not limitation, computer readable media may include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a selection or pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
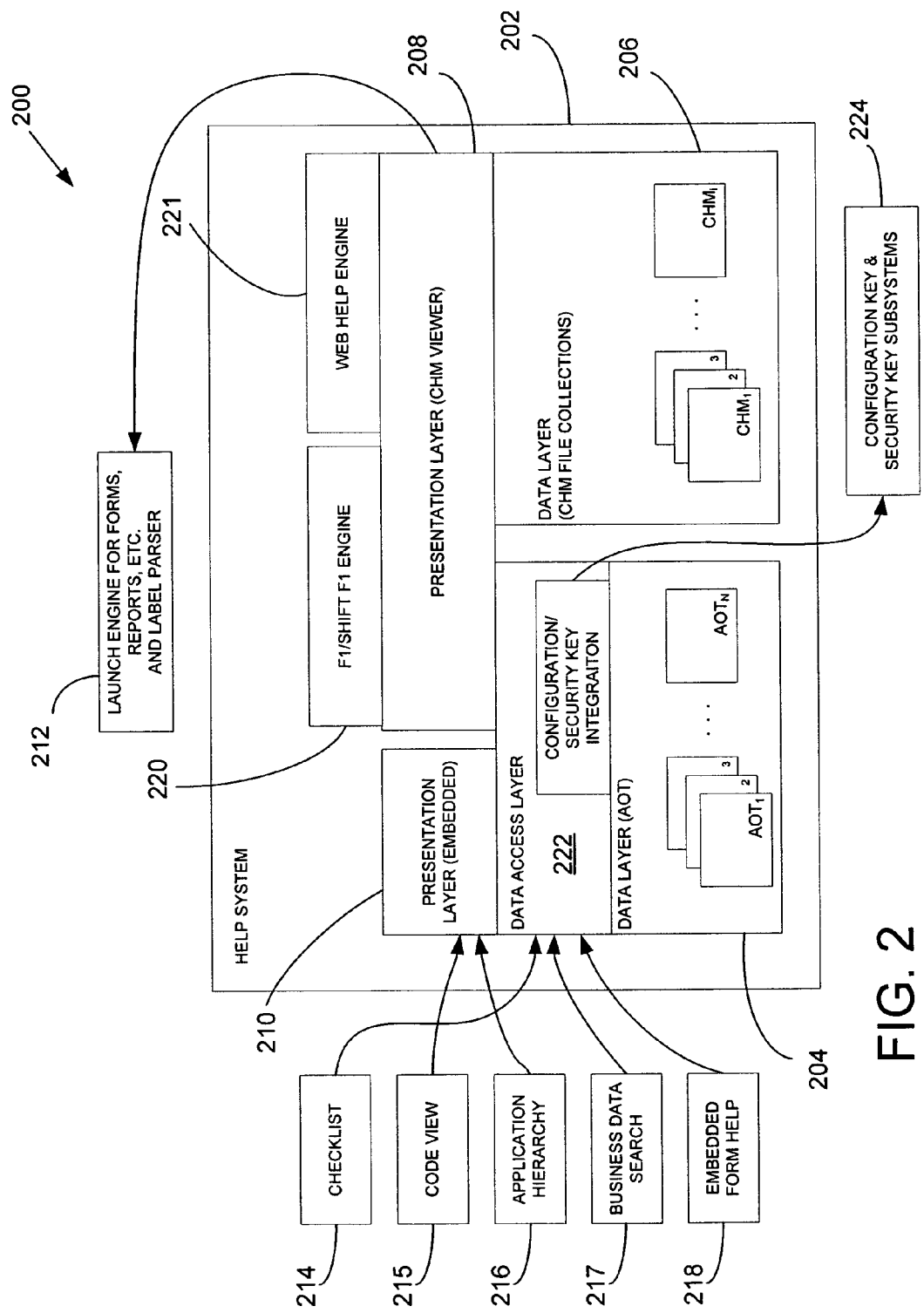
FIG. 2 is a block diagram of an exemplary application program having a help system to generate a help user interface having both static and dynamic content in accordance with multiple aspects of the disclosure.

With reference now to FIG. 2, an exemplary application program 200 is shown in diagrammatic form as having a number of components, such as program modules or data files. The application 200 includes a help system 202 adapted to generate a help user interface with dynamic help content in accordance with the methods and techniques described herein. Generally speaking, the dynamic help content is rendered based on the user context in which the help system 202 is invoked. The user context may be determined, in part, by the configuration of the application 200, as described below. The user context may also be determined by a current user role (or other user identification information). In this way, some embodiments rely on the user context to control the help user interface to provide help functionality and content in a secure manner. That is, the user context will assist in scenarios where help content is to be protected or presented based on a user's role. Some embodiments may not rely on the user role or identification, insofar as the user role is not help content-determinative. In such cases, the user context may instead be driven by, for instance, the characteristics of a site or group customization of the application 200. In any case, such sources of customization collectively define, establish or otherwise provide a specific user context for the application 200 to which the help system 202 adapts by providing dynamic or customized help content via the techniques described herein.

The help system 202 may, but need not, be a component, sub-system or module of the application 200, as depicted. In some embodiments, the help system 202 may be associated with the application 200 on a non-exclusive basis (i.e., such that the help system supports the help function for multiple program applications). In any case, the help system 202 may be implemented as a standalone application program or invoked via the user interface generated by the program application 200. In the latter case, the help system 202 may be invoked via a number of alternative user interface routes, such as selection of a user interface display element (e.g., a command from a drop-down menu) or by using a keystroke (e.g., pressing the F1 key).

In some embodiments, the help system 202 may generally be based on a HTML-based viewer module (e.g., a CHM viewer as described below) to support displaying help content data stored in help files (e.g., CHM files). The help system 202 may be launched from the application 200 via F1/Shift-F1 or other desired keystrokes to display the appropriate help articles inside the help interface rendered by the viewer. In some cases, the help files may be modified and/or created by a number of sources, including the original software developer (via the primary and update releases), development partners, and/or other third-parties involved in customizing the application 200. To this end, standard help creation tools may be used to customize the help files, which may, but not be, made available with the application 200 as an integrated feature. As described below, the help files (or other help data sources) may be used to support the presentation of both static and dynamic help content for the application 200.

The help system 202 includes a number of modules or other components for implementing the tasks involved in generating the help user interface. The modules and components are generally configured for operation with (or within) various protocol or other logical layers dedicated to processing or otherwise handling the help content data as the data progresses through the process described herein for rendering help content via the help interface. In some embodiments, the layers may provide more than one path for the rendering help content. The exemplary embodiment of FIG. 2, however, is directed to one path based on a pair of data sources 204 and 206. Because the data sources 204 and 206 may be stored or otherwise made available in a system-wide, centralized or other networked manner, other paths or tools for rendering content may rely on the data sources 204 and 206 as well. The data sources 204 and 206 are depicted and described separately for convenience, and may alternatively be stored in an integrated data structure or other combined fashion, as desired.

In the exemplary embodiment shown in FIG. 2, the help system 202 includes data layers or stores 204 and 206 for storing and handling the data, code and instructions (collectively "code") that act as the source, and control the rendering, of the help content. Generally speaking, the code may include data that corresponds directly with the help content to be presented. Alternatively or additionally, the code is indirectly representative of the help content. Either way, the code may be directed to both static and dynamic help content. To these ends, the code may include information and data that defines help content in the form of, for example, articles, documents, statements, or other textual, graphical or human-readable information, as well as computer-readable instructions interspersed therein or otherwise related thereto. The instructions may include, for example, links or other references to sources of help content, which may be stored in any database or other data structure. Such sources may be identified by filename, data structure, or any other desired manner. The instructions may also include placeholders for the dynamic help content to be integrated and presented with the static help content as described below. These instructions, placeholders and other code directed to supporting the incorporation of content other than the static content (i.e., the dynamic help content) may be referred to herein as control commands.

The data layer 204 may include a modifiable help system hierarchy that provides a repository for holding help content metadata. In some cases, the metadata may be stored in an object-oriented arrangement, such as an object tree. In the exemplary embodiment of FIG. 2, this hierarchal arrangement is established or defined via a number of application object tree (AOT) files (as shown). Alternative embodiments may rely on AOT or other files compiled, for instance, at build time. The multiple AOT files may respectively correspond with different layers dedicated or assigned to different sources of help content, as described herein below. The metadata stored in the AOT files is then merged or otherwise accessed in accordance with a precedence governing the data layers.

Generally speaking, the metadata in the data layer 204 provides a mechanism for help content customization. The metadata can be customized by, for example, secondary developers, administration personnel, and end users. Dynamic help content may therefore be incorporated into the help user interface for customization thereof in accordance with the user context. Examples of ways in which the metadata may be modified include changing authorization settings and other context markers. The data layer 204 may also include data relating or otherwise organizing or arranging the help topics for which corresponding content files are stored in the other data layer 206.

The data layer 206 may generally take the form of a collection of static files or other data structures that set forth, define or otherwise specify (either directly or indirectly) the help content. Multiple files (or data structures) may be stored in the collection to provide further customization, in the sense that different files may be accessed for different user contexts. Alternatively or additionally, the files may be hierarchal in the sense that one file may reference and incorporate the content or data from one or more other files.

The data and code stored in the data layers 204 and 206 may be stored or arranged in any desired manner, configuration, arrangement, or data structure, and need not utilize an object-oriented arrangement. The variety of ways in which the data may be stored or arranged may nevertheless be organized at one level in a layered data structure configured to separately store contributions to the help content provided by (or associated with) different developers or sources. Within each layer, the data storage arrangement may be structured as desired.

Further details regarding the layered nature of the data stores 204 and 206 are set forth below. Such details are provided with the understanding that any references to a layered data structure herein may, but need not, describe a physical nature of the data storage arrangement. In some cases, the layered nature of the data structure refers to a logical arrangement rather than any physical relationship between the data. For example, the layered nature of the data may refer to and establish the separate or discrete storage of control data. Accordingly, references herein to relative relationships between the layers (e.g., inner, outer, core, etc.) are set forth with the understanding that the relationships are not indicative of positioning or other physical aspects of the control data, code, etc.

In some embodiments, the data layer 206 may constitute a fixed storage medium for help content data. In these cases, the data layer 206 may include a collection, set or other arrangement of one or more data files or other data structures for storing the help content data that remains unchanged between upgrades or other updates to the help system, program application, operating system, etc. However, the data files need not be limited to storing data directed to static help content. Rather, the data files may set forth the placeholders, instructions, controls, commands and other entities directed to supporting the incorporation of dynamic help content. Code, data and other information provided via development sources other than the original developer may then be stored elsewhere and accessed for integration or combination with the static information stored in the data layer 206. In that way, the static code of the data layer 206 is processed during implementation of the help system 202 to provide customized, variable help content.

Practice of the disclosed method and system is not limited to any particular help file format, although some embodiments may utilize, for example, an HTML or other markup language based format, such as the Compressed HTML Help (CHM) format. In such cases, the CHM or other files may be read, interpreted or otherwise processed by a viewer (e.g., a CHM viewer) to generate the graphical, textual and other components defined by the help content data set forth in the file. To that end, a CHM-based presentation layer 208 may be dedicated to processing the code and/or help content data in the data files stored in the data layer(s) 206 in connection with the rendering of the help user interface. To this end, the presentation layer 208 may also consult the metadata stored in the data layer 204 for customization and other purposes in controlling the processing of the code and data presented by the CHM files stored in the data layer 206.

As shown in FIG. 2, a further presentation layer 210 may be utilized for processing help content data residing or originating outside of the files stored in the data layer 206 (e.g., CHM files). The presentation layer 210 may, for instance, be dedicated to rendering help content associated with help data made available via the data layer 204 and from other sources, as described below. The presentation layer 210 may also be used to generate portions, components or other aspects of the help user interface (and/or other user interfaces) that are presented outside of the user interface display panel generated by the help viewer of the presentation layer 208. For example, a separate pop-up box, window or other display element may be generated as part of the help user interface to present an exemplary report of a business application. Such display elements may also provide or support the functionality of the application 200 itself, in the sense that the display element may generate, for example, a form for entry of data into a database of the application 200.

As shown in FIG. 2., such forms and other display elements generated by the application 200 may also be accessed or invoked by the user via the portions of the help user interface generated by the presentation layer 208 through, for example, a link or other active control. To that end, the presentation layers 208 may pass data to a launch engine or other module 212 of the application 200 capable of generating the form, report or other display element called by the help system 202.

One or both of the presentation layers 208 and 210 (and, more generally, the help system 202) may provide data, information or content to a number of different components or modules within the application 200. That is, in addition to the entrypoints into the help system 202 that involve, for example, F1 keystrokes, various other components of the application 200 may call for, request, and otherwise generate content provided by the help system 202. To these ends, the various components of the application 202 may request that the presentation layer 208 (or presentation layer 210) look up the content in the data stores 204, 206, and return a result to the component for integration and rendering with its user interface. In the exemplary embodiment shown in FIG. 2, the application 200 may include a checklist module 214, a code viewer module 215, an application hierarchy tree 216, a business data search module 217 and an embedded form help module 218. As shown, one or more these modules may communicate with the help system 202 at a different protocol or layer than the presentation layer, which may vary based on the nature of the data and content requested.

More generally, the content available from the help system 202 may be processed for rendering in a user interface generated by the application 200 by any number and type of display engines. The exemplary embodiment shown in FIG. 2 includes two engines in addition to the launch engine 212 for forms and reports, namely an F1/Shift-F1 engine 220 and a web help engine 221. Both of the engines 220, 221 receive data from the presentation layer 208 configured for rendering of help content via the procedures specified in the engines 220, 221. Because the presentation layer 208 communicates with the data layers 204, 206 for the incorporation and integration of dynamic help content (as described herein), the engines 212, 220 and 221 may include or involve conventional routines, as desired.

The manner in which the help user interface is customized may vary depending on the nature of the control command, metadata or other code set forth in the data layers 204, 206. In some cases, the code may specify that portions of the help user interface generated by the CHM viewer of the presentation layer 208 be replaced or otherwise modified. Customization in this sense may involve incorporation of the information and data into placeholders and other portions of the documents and other display elements rendered by the viewer. In other cases, the information and data may be used to supplement those CHM-based display elements to present additional forms, reports and other display items that constitute other portions of a customized help user interface. In either case, the engines 212, 220 and 221 are provided with the data for the generation of the help and other user interfaces.

In accordance with some embodiments of the disclosed system and method, the help system 202 further includes a data access layer 222 to control the incorporation of help content data and, therefore, the customization of the help user interface. Generally speaking, the data access layer 222 controls the manner in which, as well as the extent to which, the help user interface is customized based on the user context in which the help system 202 is invoked. The user context, in turn, is determined in part based on the configuration of the application 200, which may include an indication as to whether the help system 202 was invoked independently of the application 200 (i.e., as a standalone program). The application configuration may also be indicative of whether certain application functionality is installed or otherwise available to the current user, in which case the help content will be generated accordingly. In this sense, the application configuration may be indicative of the type of user invoking the help system 202, insofar as the application 200 may be installed with different components and features for different user types. For instance, the help content may be customized via the disclosed system and method differently for a system administrator than for an end user. Similarly, the application 200 may provide functionality and flexibility for third-party developers (or other users) to develop add-on programs, modules, etc. But such capabilities might be made inaccessible to the end user, in which case all of the help content directed to supporting such additional development should not be made available. Still further, some applications, such as business applications, may have a variety of different user types (e.g., accounting, management, manufacturing, sales, etc.) requiring vastly different types of forms, reports and other user interface elements. In this way, the help system 202 accommodates the widely varying contexts in which the application 200 is implemented. To these ends, the data access layer 222 attempts to establish a communication connection with a configuration key subsystem 224 or other component of the application 200 to determine the details of the application configuration. This determination may be made, in some embodiments, upon the startup of the application 200. Alternatively or additionally, the determination may be made upon receiving the request for help content or data.

As described above, the manner in which the application 200 has been installed may be indicative of aspects of the current user, provided that installation of the application continues to have the same user or user type. In other cases, however, an installation of the application may be shared by multiple users in, for instance, a distributed computing environment. In these and other cases, it may be useful for the data access layer 222 to also consult a security key subsystem of the application 200 to determine one or more characteristics of the current user. The current user may be established in any desired fashion, including via, for instance, an operating system login or a login procedure dedicated to the application 200. In any case, the current user may have a user profile establishing one or more user characteristics determinative of the manner in, and extent to, which the help content should be customized. For instance, a user having system administrator access privileges may be given detailed instructions and enabling display elements in the help user interface regarding configuring the application 200. More generally, the user profile may establish a user characteristic indicative of the user's account with the application. The user account may be indicative of a job, role or position, thereby enabling the help system 202 to customize the content accordingly.

Figure 3:
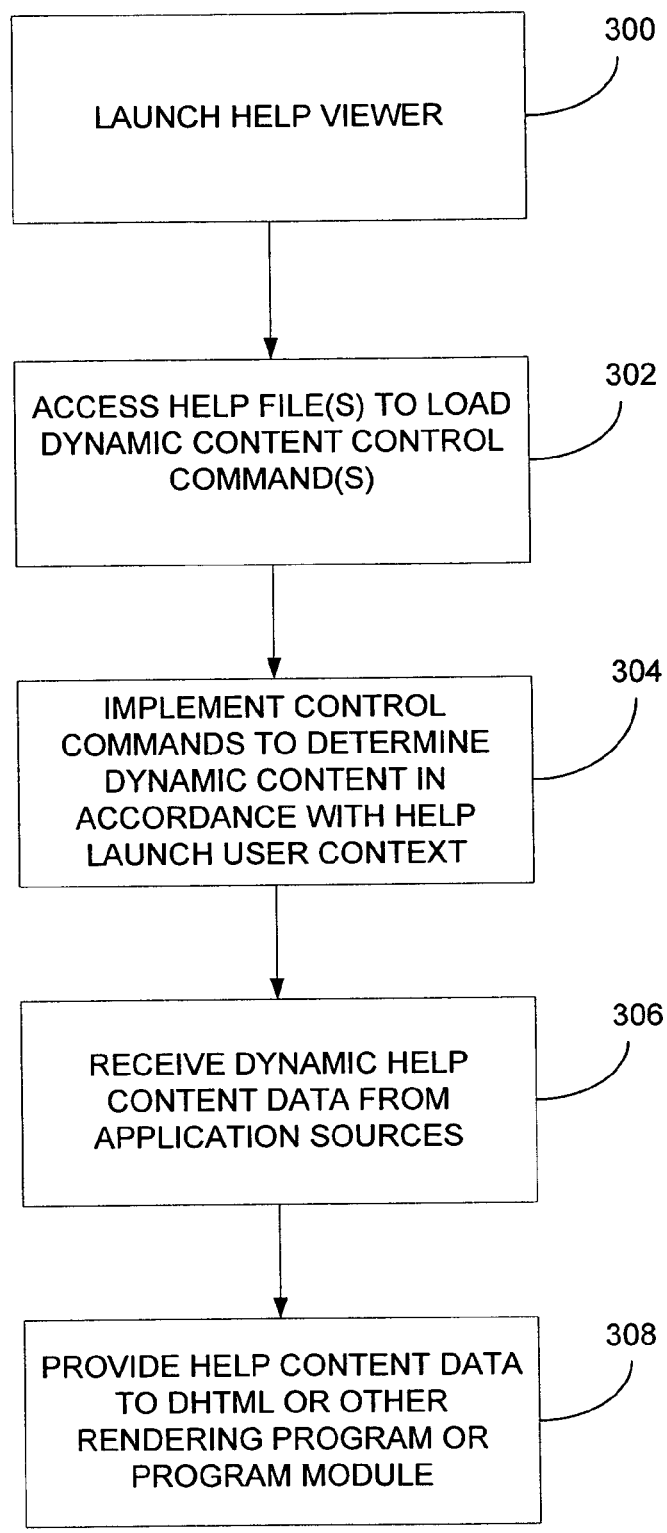
FIG. 3 is a flow diagram depicting implementation of the help system of FIG. 2 in accordance with one disclosed technique.
Figure 4:
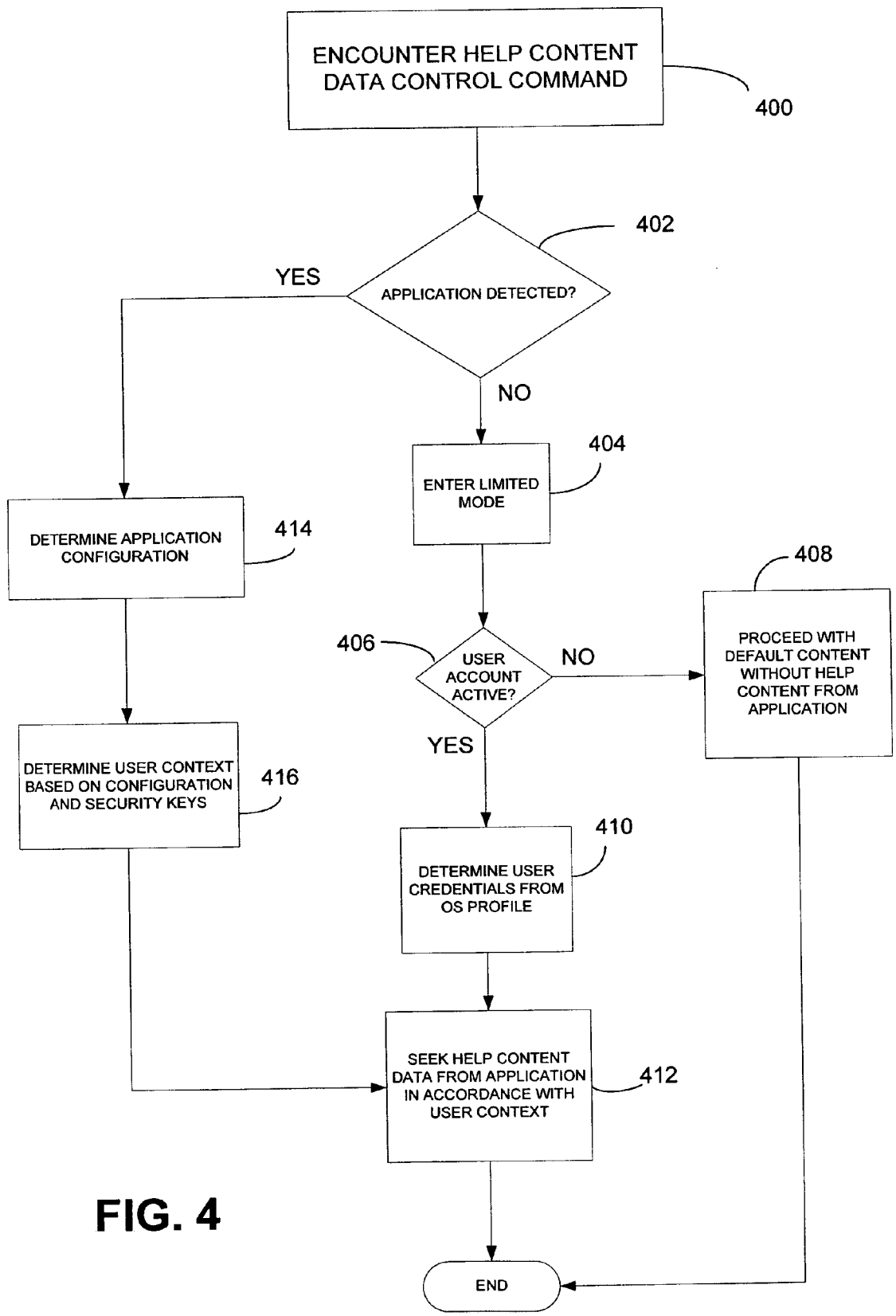
FIG. 4 is a flow diagram depicting the implementation of FIG. 3 in greater detail in connection with generation of the help user interface in a secure manner in accordance with one embodiment.

Turning to FIGS. 3 and 4, the steps taken by the help system 202 to generate a help user interface having both fixed (static) and dynamic (customizable and configurable) help content customized for the application configuration and, more generally, the current user context, are described in accordance with an exemplary embodiment.

FIG. 3 provides an overview of the process. At the outset, the help system 202 and, specifically, a CHM or other help viewer module thereof, may be launched in a block 300 in response to a help request. The help system 202 may then load any CHM or other help files relevant to the help request in accordance with context-sensitive help techniques known to those skilled in the art. Alternatively, or additionally, the help viewer may also load or access data sources or structures other than help files, as desired, such that practice of the disclosed techniques is not limited to a file-based implementation. In any case, the CHM file(s) or other data source(s) may then be accessed or otherwise processed to determine the help content data for rendering via the help user interface. At block 302, the processing of the help content data may include both static help content, such as text or other graphics, and one or more control commands defining placeholders for the incorporation of dynamic help content. The control commands are implemented in a block 304 using the data access layer 222 to determine the dynamic help content in accordance with the user context (e.g., application configuration) in which the help system 202 was launched. More specifically, the control command may cause the presentation layers 208 and 210 to consult the data access layer 222 and the underlying data layers 204 and 206. To this end, the control command may present an ActiveX control, Java Applet or other instruction that passes a request to the data access layer 222 for the help content data underlying the customized help content to be rendered.

As described above, the help content data supporting the customized help content may then be received in a block 306 from one or more modules or components of the application 200. Depending on the nature of the data and the control command, the presentation layer 208 may then render the help content using a DHTML or other rendering module in a block 308. To this end, the presentation layer 208 may use a web browser control that supports dynamic updating of HTML content to combine the fixed (static) help content with the dynamic help content that is dependent on the user context, which includes and incorporates any customization and configuration of the application 200 applicable to the current user. In short, dynamic HTML allows the application 200 to alter the displayed HTML code at runtime. In the exemplary embodiment of FIG. 2, the presentation layer 208 may read data from an AOT in the data layer 204 using, for instance, javascript. Then, using the same javascript, the presentation layer 204 updates the contents of the static HTML page to be displayed to the user.

With reference now to FIG. 4, the steps taken to establish the user context and implement the control command in connection with the block 304 (FIG. 3) are shown in greater detail in accordance with an exemplary embodiment. At the outset, the presentation layer 208 encounters a control command in the help content data in a block 400. Implementation of the control command directs the presentation layer 208 to attempt in a block 402 to establish a communication connection with the application 200. The connection attempt may be made between the data access layer 222 and either the configuration key subsystem or the security key subsystem 224. Alternatively or additionally, the help system 202 may attempt to detect whether the application process space is resident in memory. If the application is not detected, control passes to a block 404 that causes the help system 202 to enter a mode where the help content is customized to a limited extent. More specifically, the help system 202 may fall back to a mode where a limited amount of information is presented in accordance with the current user's credentials. For example, non-sensitive information, such as the labels for tables and forms presented via the help user interface, may be updated to reflect the application configuration, but links to enable implementation of application functionality would not be active or provided. In that way, the help system 202 may not present a security hole through which the integrity of application data may be compromised. This security protection may be useful in connection with business applications that handle sensitive data, such as financial data, personnel data, customer data, and other trade secrets of the enterprise.

To determine the user credentials, a decision block 406 may first determine whether the user currently logged into the operating system has an active account with the application 200. If the current user does not have an active account, then control passes to a block 408 that directs the presentation layer 208 to proceed with default or generic content for the placeholder associated with the control command. In other words, the control command does not retrieve any information from the application 200. The non-customized content rendered via the help user interface may include inactive links, an error message, or no link indication at all, as desired. For labels and other textual items, the user interface may display generic text.

If the current user has an active application account, then the user credentials are determined from the user profile in a block 410. As described above, the user credentials are therefore determinative of the user context, and limited information is sought from the application 200 in a block 412. For instance, the customized labels for forms and tables may be provided, but any links to invoke the functionality of the application (e.g., calling up a form for data entry) may be displayed as inactive.

If the application process space is detected, then the help system 202 is running inside of the application 200 and further customized help content may be safely provided. Accordingly, control passes to a block 414 that establishes the communication connection (if not already established) and determines the application configuration. As described above, the block 414 may be implemented via the data access layer 222 through communications with the aforementioned subsystems of the application 200. The application configuration and, more generally, the user context can then be determined in a block 416. Control then passes to the block 412 to see the help content data from the application 200 in accordance with the user context. In this case, the help content data sought by the help system 202 may support any application function appropriate for the user and application configuration. For instance, if the user is a software developing partner, the help content data may reveal source code, object hierarchies, etc. to assist in the software development process. If the user is a system administrator, the help content data may present instructional items on establishing user accounts. In other cases, the help content data may support the generation of user interface display elements that allow the user to enter, view or process sensitive data (e.g., financial data) not accessible to users with different access privileges.

Figure 5:
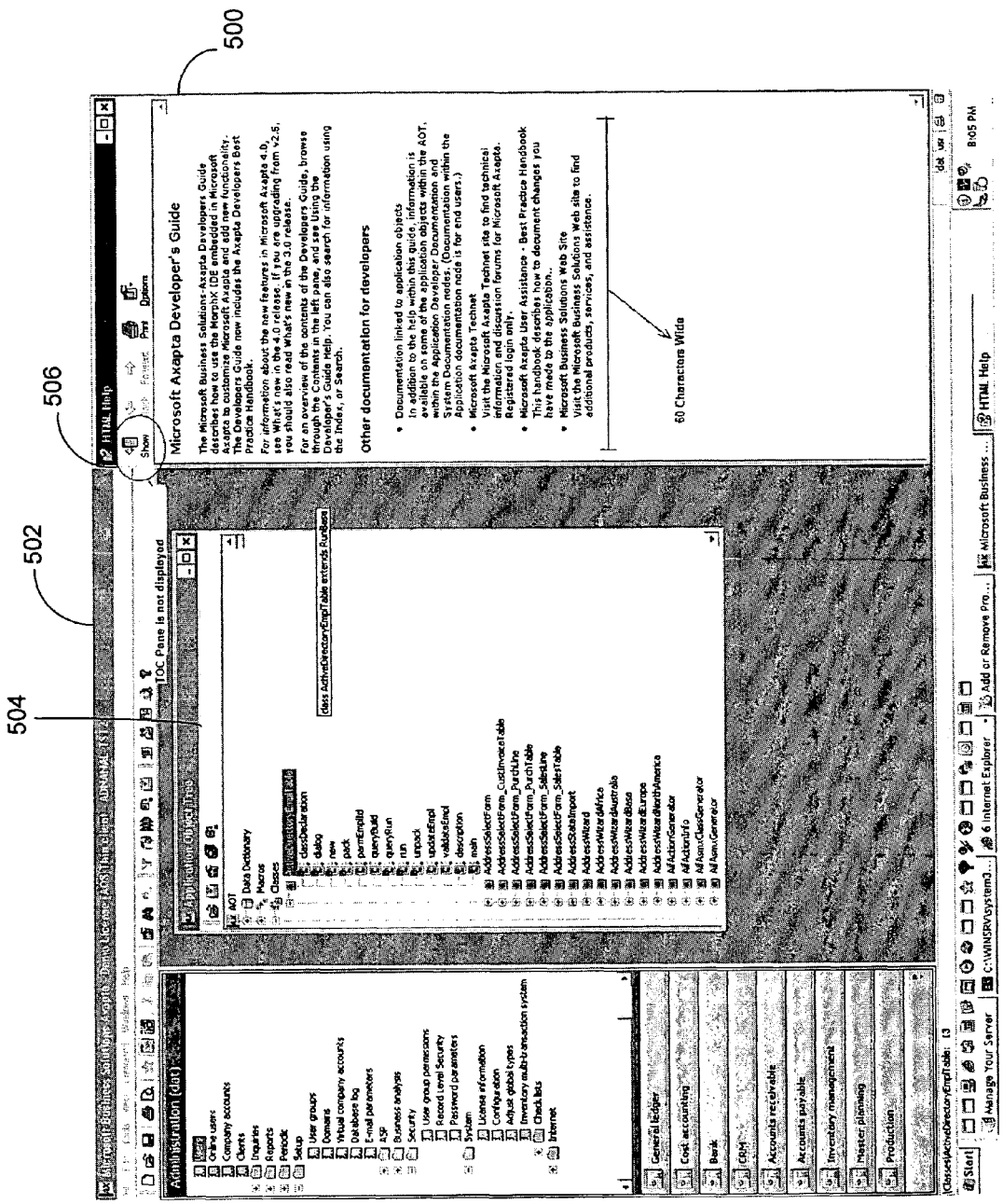
FIG. 5 is an exemplary help user interface generated by the help system of FIG. 2 in the context of a user interface display generated by an exemplary business application program.

With reference now to FIG. 5, an exemplary help user interface 500 is shown as rendered within a user interface display 502 generated by an exemplary program application. In this example, the help content rendered in the interface 500 is directed to a developer's guide for adding new functionality to the application. To that end, textual information is provided for the developer, as well as a separate window 504 depicting an application object tree. Further help information may be accessed via a table of contents pane (indicated as not shown; but see FIG. 6), which in turn may be accessed by selecting a button 506. From the window 504, the developer-user may select an object class to view further information or drill down to sub-classes, objects, object methods, etc. In this case, the exemplary application is a business application generally providing a number of enterprise organization functions, such as cost account, accounts receivable, accounts payable, etc. While the disclosed techniques are shown and described in connection with a business application context, the disclosed method and system may also be utilized in any number of other application contexts as well.

Figure 6:
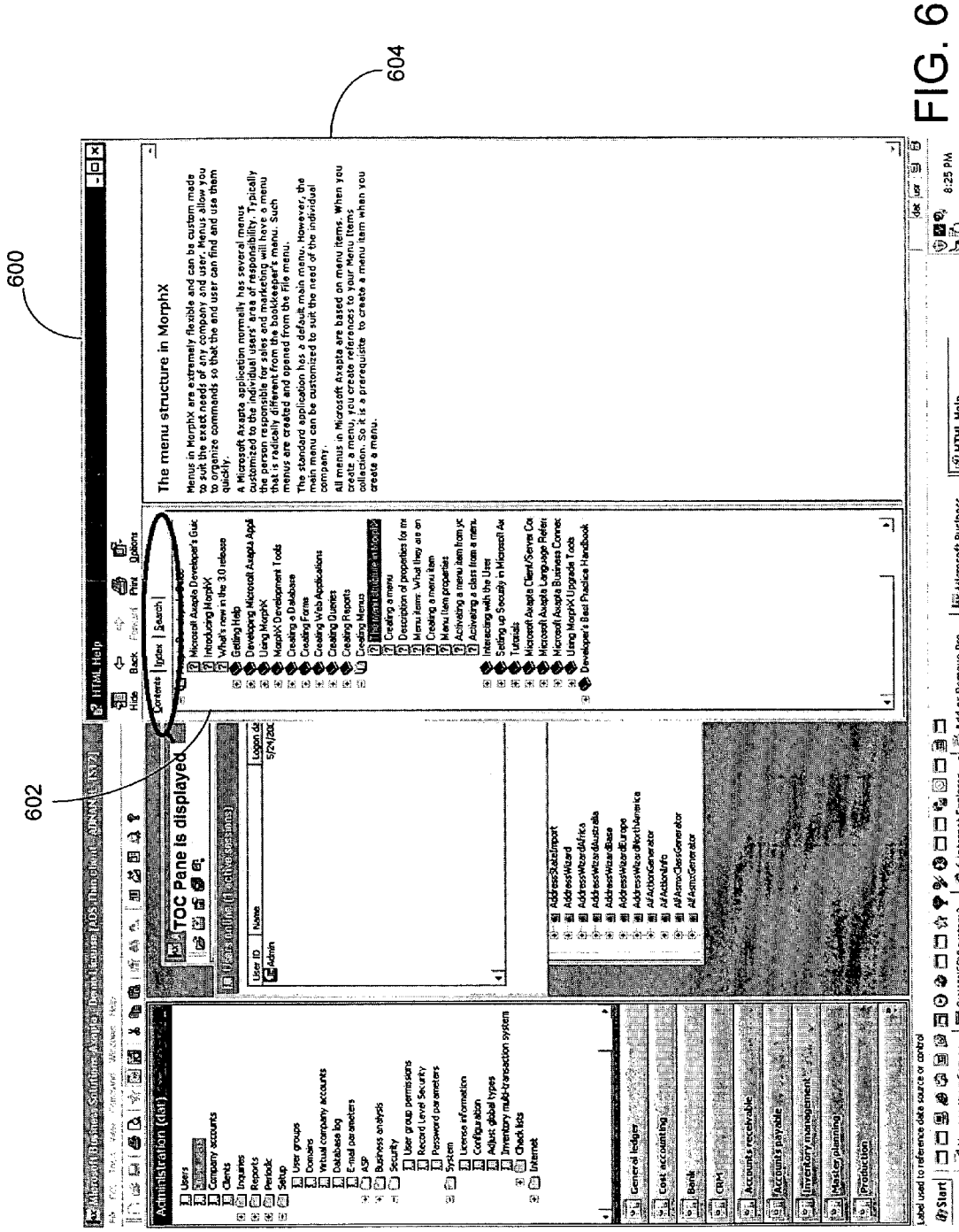
FIG. 6 is another exemplary help user interface generated by the help system of FIG. 2 in the context of a user interface display generated by an exemplary business application program.

FIG. 6 depicts another exemplary help user interface 600 generated in accordance with the disclosed techniques. In this case, the interface 600 includes a window having a table of contents panel or pane 602 dedicated to presenting an indexed or other summarized view of the contents of the help system 202. The interface 600 includes a further panel 604 to display the help content associated with an item selected from the table of contents panel 602. In accordance with the disclosed techniques, content set forth in the panel 604 may be customized in accordance with the user context. In this example, the content is generally directed to explaining how the application permits menus and menu items made available to the user may be customized. Because the explanation is more suited for users authorized to configure the application (e.g., a system administrator), the content shown in the panel 604 may not be made available to all users. Similarly, the index item in the panel 602 may also not be displayed unless the current user has an application account (and the corresponding access privileges) appropriate for viewing such help content. As a result, the CHM file(s) in the data layer 206 (FIG. 2) may include one or more control commands that are implemented to either include or exclude this help content from both the table of contents and the, more generally, the help user interface.

Once the features and functionality of the application are created or established by the administrator, secondary developer, or other entity customizing the application, suitable help content may also be created to instruct the end users that will encountering such features and functionality. To that end, the underlying help files may be created using any authoring tool (or editor) for CHM or other HTML-based help files. In accordance with the disclosed techniques, tags or other script defining control commands may be inserted into the source files created via the authoring tool to act as placeholders for dynamic content. The source file may then be processed (i.e., compressed or compiled) to replace the tags with appropriate control commands, such as ActiveX controls, as described above. The resulting CHM or HTML help file may then be deployed for installation on client computers.

An example of the customization made available by the above-described technique may involve insertion of business application terms established for the application, as configured at a specific installation. To present a statement via the help user interface such as "To access your Accounts, click on this", the underlying CHM file may have the following help content data and control command set forth therein:

To access your <Label:@SYS1>click on <a href=<DisplayForm:Customers>>this</a>
where the following definitions are stored in the AOT and retrieved via the data layer 204:
@SYS1="Customers"
@SYS1="Accounts"
@SYS1="Institutions"

Figure 10:
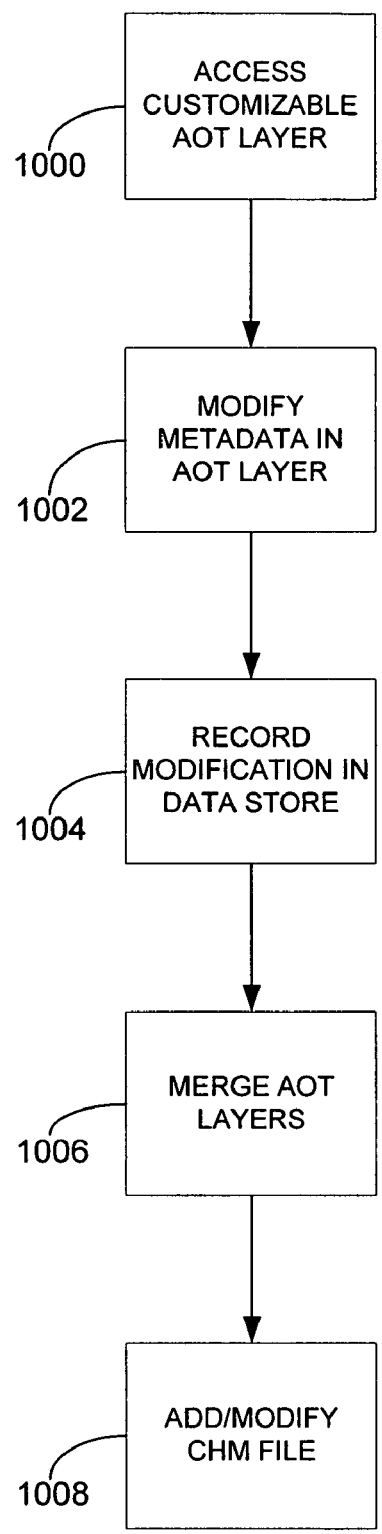
FIGS. 10 and 11 are flow diagrams depicting procedures for customizing or configuring a help user interface in accordance with another aspect of the disclosure in which separate layers of control data are specified for respective contributions to the help user interface.

The ActiveX controls and other commands set forth in the help content data may support the following exemplary content customization for the help user interface:

(i) allow the help system to query which application modules have been purchased and only show help content for purchased modules;

(ii) allow the help system to query what the role of the current user is and show help customized for that role;

(iii) enable security and authorization checks on any business object to see if it is suitable for the current user's role;

(iv) customize names and descriptions for business entities via dynamic labels (please see FIG. 10 for an exemplary help user interface depicting customizable label names and other header information, such as navigation information);

(v) support links to execute or display user interface elements such as forms, reports and other application functions (please see FIG. 10 for an exemplary help user interface depicting a link to a form);

(vi) display class, method, variable names and other named identifiers directly from the source code (see FIG. 11 for an exemplary help user interface depicting such customized help content); and, (vii) display code samples or other annotations such that if the code is modified after application shipment the help content always stays synchronized therewith.

Figure 7:
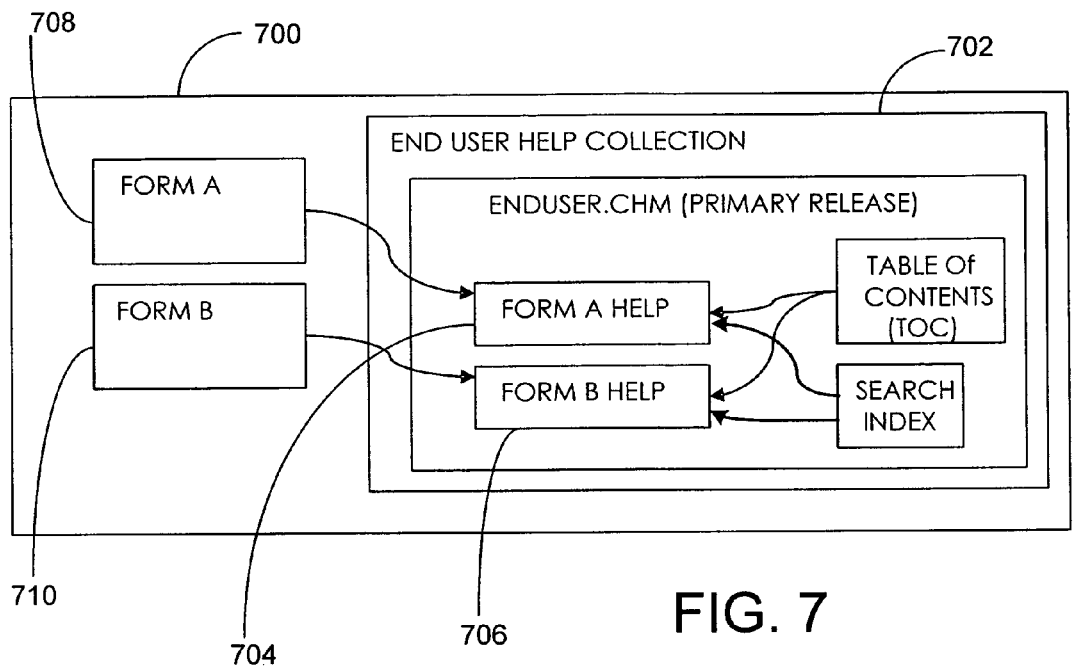
FIGS. 7 and 8 are block diagrams depicting data flows in connection with the generation of exemplary help user interfaces in accordance with one embodiment.
Figure 8:
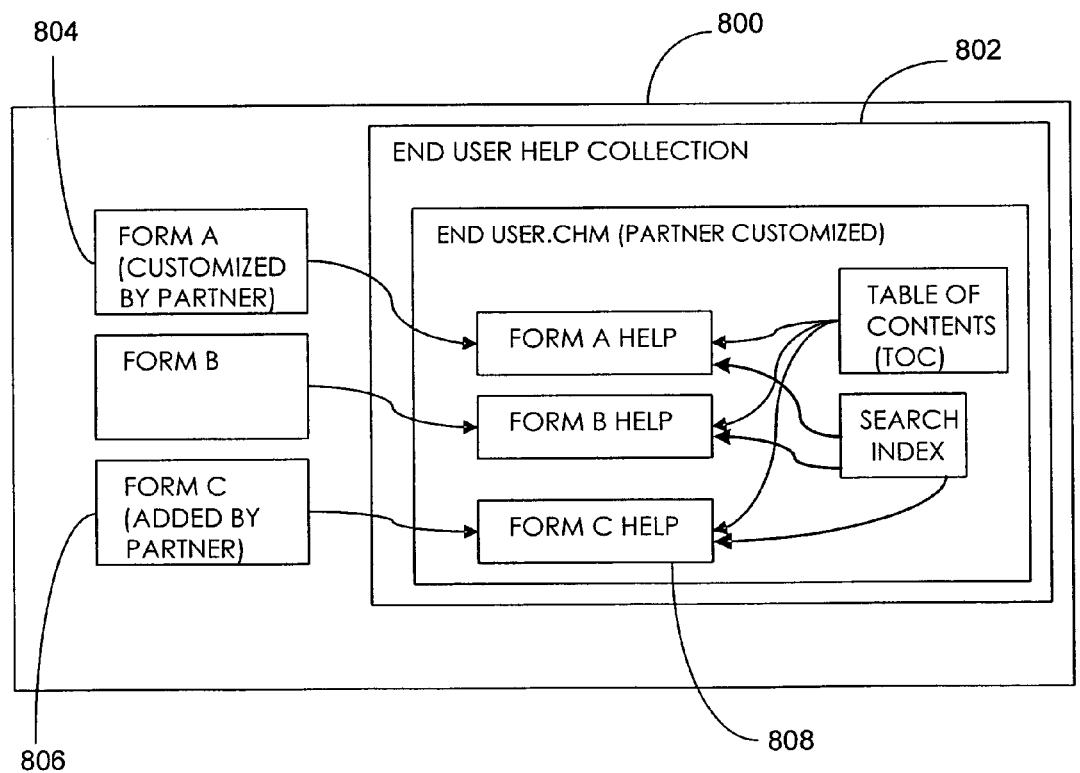

While practice of the disclosed techniques is not limited to the foregoing examples, FIGS. 7 and 8 depict an application 700 and help system 702 in simplified form to illustrate how the disclosed techniques may be utilized to support the addition of a form (i.e., Form C) to those forms (i.e., Forms A and B) available in the standard configuration of the application 700. Specifically, the help system 702 is shipped with a CHM file defining a table of contents, search index and other help user interface components to provide content regarding two forms, Form A and Form B to an end user. Other CHM files (not shown) may be stored and available for other entities, such as administrators, development partners, etc. Help content data for the use of the two forms may be set forth in respective portions 704 and 706 of the CHM file, which may include control commands to support customization. Implementation of those commands during the rendering of the help user interface results in retrieval of the dynamic help content data for customization, if permitted by the current user context. As described above, the dynamic help content may be set forth in the AOT data source. As also described above, the help content generated by the help system 702 need not be limited to presentation within a help user interface, and may also be requested from modules 708 and 710 within the application process space directed to generating forms, reports, etc.

FIG. 8 depicts the same exemplary application and help system shown in FIG. 7, but redesignated to indicate that a development partner has introduced modifications and additions after shipment of the application 700. As modified, an application 800 includes a help system 802 capable of rendering a help user interface that identifies an additional form, Form C, and modified versions of the Form A (indicated as "customized by partner"). To that end, the development partner may have modified the help content data in the corresponding sections of the CHM file, and alternatively or additionally modified the data stored in the AOT. Specifically, the application 800 now includes modules 804 and 806 that access the customized help system 802 to request the corresponding static and dynamic help content. As shown, the CHM file within the help system 802 has also been updated and supplemented to specify static content and control commands in a section 808 thereof. The table of contents and index portions of the CHM file may also be updated to support navigation to the help content provided by the new section 808.

With reference again to FIG. 2, some embodiments may structure the data stored in the data layers 204 and 206 in a manner that supports continuous publishing of secondary help content despite updates or revisions to the underlying code (and help content) established by the primary developer. These embodiments therefore avoid the problem of losing the customization of the application by a secondary developer, administrator, etc. when the application is revised or updated.

In the past, metadata layers have been used to support customization of business applications, such as Microsoft Axapta 3.0. Such layers corresponded with and established a hierarchy of levels in the application source code to ensure that modifications and additions can be made without interference with the application objects defined in other levels. More specifically, the layer (or level) hierarchy may be arranged such that the basic or core level corresponds with the basic application as provided by the primary software developer. Proceeding from inner to more outer layers, the next layer may correspond with the additional functions and modules (e.g., integrated, certified solutions) provided by a development partner. Other layers, in increasing levels of customization specificity, have been devoted to (i) country-specific general functionality specified by a distributor, (ii) additional certified solutions from country-specific (i.e., local) development partners, (iii) vertically integrated solutions related to business partners of a specific customer, (iv) other functionality involved in customer-specific interaction with business partners, (v) customer-specific modifications for the entire corporation, and (vi) site-specific modifications for each customer site. In this way, customization of the application by various development partners, distributors (i.e., resellers), country-specific developers, business or industry partners, customer administrators, and application end users, has been accommodated while avoiding adverse effects on application objects specified by others.

One example of the use of layers involves the customization of labels within Microsoft Axapta v. 3.0. Administrators and other individuals involved in the configuration of the business application for a particular site, workgroup, etc. often customize various forms and other user interfaces generated by the business application. For example, the standard sales report may generically refer to "Clients," while a customized version thereof may modify the label definition with a new name, such as "Accounts." The customized version of the label may be specified and saved as an application object in a layer (e.g., business/industry partner level) higher than the layer (e.g., country-specific level) specifying the standard generic label. Deleting the application object in the higher layer would cause a reversion to the standard label. But while the application object for the customized version of the label exists, the modification specified by the overshadows the lower layer, and the more generic information.

FIG. 2 depicts the data layers 204 and 206 as having a number of AOTs and CHM files, respectively. Each AOT may be associated with, and specify metadata for, a respective layer. To that end, the object hierarchy may be replicated in each AOT, albeit with modifications introduced by the entity customizing that layer. Similarly, each layer may have a corresponding CHM file. In practice, however, each layer may have any number of CHM files to accommodate different user contexts. For instance, two different users may have different access privileges, and therefore access entirely different CHM files. Alternatively or additionally, the differences in the help content displayed to the two users may be addressed via the metadata in the AOT.

The merging of the layers may then proceed in accordance with the order, or precedence, that gives greater weight or priority to the outer layers. In this way, the layer precedence protects the content specified by the secondary developers from being overwritten by changes to the more inner layers, such as the primary developer layer.

In some embodiments, the above-described maintenance of separate contributions to the help content utilizes a collection of help content source files. Generally speaking, maintaining separate source files for the contributions (i.e., additions, modifications, etc.) of the primary developer, secondary developers, administrators, etc., supports subsequent revisions to one contribution without hampering the content of another.

Figure 9:
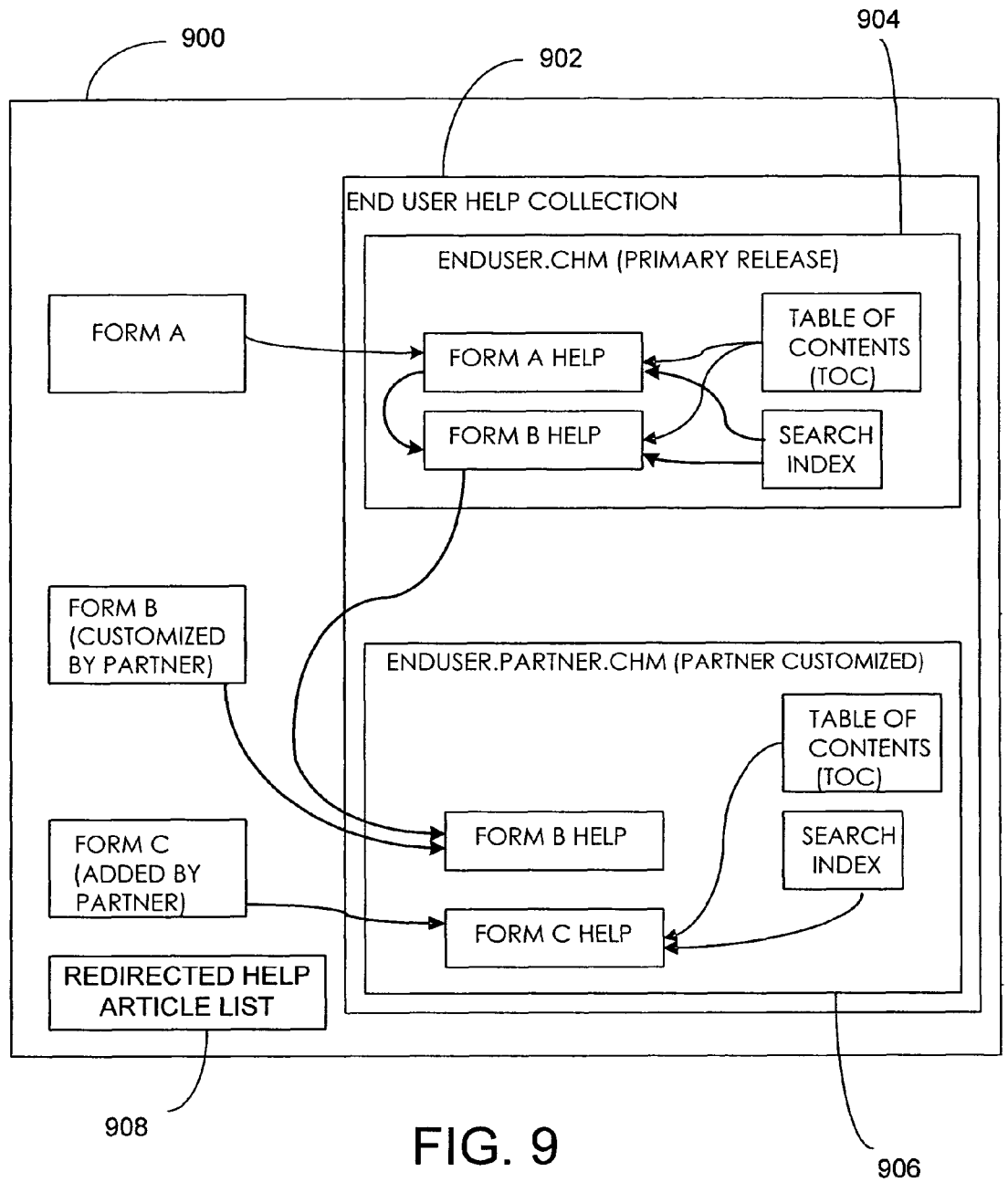
FIG. 9 is a block diagram depicting data flows in connection with the generation of an exemplary user interface in accordance with an alternative embodiment.

FIG. 9 depicts an embodiment of a help system 900 having a collection 902 of help content source files that effectively combines aspects of the help systems shown in FIGS. 7 and 8. The collection 902 may be stored in any desired fashion, and may have any number of source files corresponding with the different layers, or contributions, from various development sources. In this embodiment, the collection 902 includes two CHM files 904 and 906 corresponding with the help content contributions from a primary developer and secondary developer (or development partner), respectively. The CHM file 904 specifies content for an exemplary pair of forms (i.e., Form A and Form B), while the CHM file 906 specifies content for an additional form (i.e., Form C), as well as modified content for one of the original forms (i.e., Form B).

In this exemplary embodiment, the CHM files 904 and 906 specify separate data for the table of content and index functions, as shown. The separate data may be merged at runtime, or alternatively at build time, to compile the data utilized for rendering of a table of contents and index that covers all of the help content available. The data set forth in the CHM files 904 and 906 may also be either merged or compiled at run time or build time, as desired.

To assist in the merging, compiled and/or execution of the instructions in the CHM files 904 and 906, the CHM file 904 may include one or more redirection references to the other CHM file 906. An exemplary redirection reference is shown in FIG. 9 as an arrow connecting the help content specified for the Form B, which, as described above, was modified by the secondary developer (or development partner). A list identifying those portions of the help content (e.g., the help topics) implicated by such redirection references may be stored separately as, for instance, a redirected help article list 908.

The manner in which the AOT files stored in connection with the data layer 204 (FIG. 2) accommodate separate layers of help content metadata is now described in connection with FIGS. 10 and 11. With initial reference to FIG. 10, an editor or other suitable interface may be utilized to create, edit and otherwise configure the metadata layers (and ultimately, the help user interface). In some embodiments, an AOT hierarchy may be already and automatically created and available for modification for each layer. In any case, the editor or other interface limit access to the AOT hierarchies such that each hierarchy is only customizable by the corresponding developer associated with that hierarchy. Other access schemes may be utilized as well. In any case, the developer accesses the customizable AOT layer in a block 1000 and modifies the metadata as desired in a block 1002 using the editor or other interface. Such editing may involve any processing, including, for instance, the downloading of preset files or instructions. The modifications may be incorporated into the AOT layer in any desired manner. Once the modifications are complete, the developer stores in a block 1004 the AOT layer, as modified, in the data store associated with the data layer 204 (FIG. 2). In some embodiments, a block 1006 implements a merge or compilation routine that merges the AOT layers in accordance with the layer precedence to compile the contributions from each layer. Such compilation, however, need not occur at build time, but rather may occur during run time as the user requests help content. On possible reason to wait until run time, or at least for a period of time after modifications to the metadata are completed, is that the help content data stored in connection with the other data layer 206 (FIG. 2) may not yet be complete. In this way, updates to the help content (i.e., via modifications to specific layers) may occur after installation of the application. Thus, at some point, as shown at block 1008, the developer also adds, modifies or otherwise prepares the help content source referenced in the AOT layer. In the exemplary embodiment shown in FIG. 10, the help content source is a discrete CHM file having the help content data arranged in instructions in accordance with that format.

Figure 11:
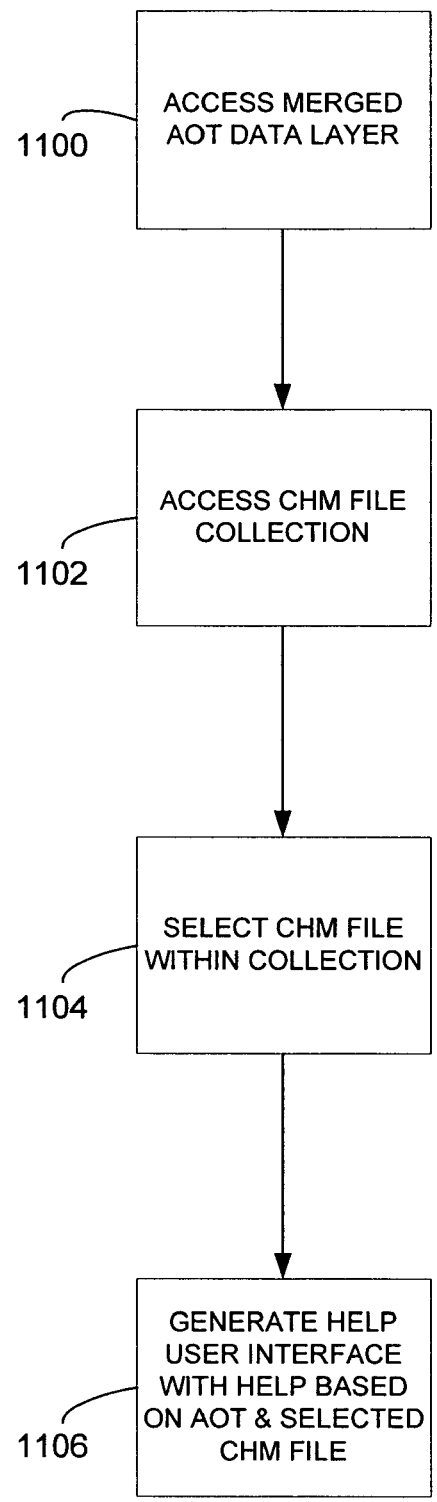

With reference now to FIG. 11, the generation of a customized help user interface based on the foregoing layer-based configuration may be initiated via any of the aforementioned avenues for requesting help content (e.g., F1 keystroke). At which point, the help system may access in a block 1100 a merged AOT data layer that has either been compiled either recently on the fly or at build time prior to installation. Next, blocks 1102 and 1104 access the CHM (or other) file collection and select a specific CHM file within the collection associated with, for instance, the user or other context in which help content was requested. For example, separate CHM files may be created and stored within the collection for different end users or end user types to address a variety of user contexts for which the help content is customized, as described above. Note that the metadata in the AOT may also address such customization when appropriate. In any event, the help user interface is then generated in a block 1106 using the functionality of the presentation layer(s) and rendering engines, as described above in connection with FIG. 2, based on the instructions and data set forth in the AOT and CHM file stored in the respective data stores. In some embodiments, each element of the user interface is rendered in accordance with the layer precedence via an algorithm that starts at the top, or outermost, layer and proceeds downward to successively inner layers until the rendering instruction is found. That is, the rendering instruction for the interface element is therefore generated in accordance with the instruction in the outermost layer.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and systems described herein are illustrative only and are not limiting upon the scope of the claims.

The invention claimed is:

1. A computer-readable storage medium adapted to store computer-executable instructions to generate a help user interface having static help content and customized help content for an application, wherein the computer-executable instructions comprise computer code to:
   implement a first data layer with static help content in the form of static files or data structures;
   implement a second data layer including a plurality of application object trees including help content metadata, the help content metadata in a layer hierarchy;
   implement a first presentation layer responsive to a user request for help and coupled to both the first and second data layers, the first presentation layer for presentation of help data from the first data layer;
   implement a data access layer between the presentation layer and the second data layer for controlling customization of the help presentation based on user context;
   implement a help engine coupled to the first presentation layer for rendering the help user interface on a computer monitor;
   access help content data defining the static help content and a placeholder to support incorporation of the customized help content wherein the customized help content comprises help for a base application wherein the help reflects included modules of the base application and help for an additional application wherein the help reflects included modules of the additional application;
   determine a configuration of the application;
   resolve the customized help content based on the application configuration;
   render the help user interface based on the static help content, the placeholder, and the resolved customized help content;
   wherein the help content metadata in the layer hierarchy is arranged in a first layer including help information corresponding to a base function of the application, a second layer including help information corresponding to a first customization of the application, and a third layer corresponding to a country-specific localization of the application; and
   communicate with a security key subsystem of the application to determine the application configuration to present only help data to which a user role is entitled.

2. The computer-readable storage medium of claim 1, having further computer code to communicate with a configuration key subsystem of the application to determine the application configuration with relation to a current usage of the application to selectively present one of the first or second layers of help information according to the current usage.

* * * * *